Patented Oct. 25, 1938

2,134,455

UNITED STATES PATENT OFFICE 2,134,455

CHEMICAL HEATER COMPOSITION

Maurice L. Spiegel, Minneapolis, Minn.

No Drawing. Application April 24, 1936, Serial No. 76,262

13 Claims. (Cl. 44—3)

This invention relates to compositions for chemically producing heat, and to their uses for various purposes, including that of permanent hair waving. Some of the objects of the invention are: to produce a stable compound; one which will not deteriorate on standing; one which can be safely handled; which is sure in action and which gives an even evolution of heat for just the proper period of time; and in which no toxic gases or disagreeable odors are produced either before or during reaction.

In this art, substances having different actions are required conformably to the various desired uses. For some uses, odors of reaction is not objectionable; for other uses, as in hair waving, odor is objectionable. For some uses, a small output of heat over a relatively long period of time is required; for others, a large output of heat for a short period is required. This invention enables one to provide the desired actions for all uses.

In general, I have found that salts may be used with magnesium to react in the presence of water, to produce various degrees of heat, over varying periods of time. I have also found that salts which, when dissolved in water, give an acid reaction, or salts which are hydrolyzed in water can be used. It has further been found that organic acids such as oxalic, acetic, citric, tartaric, can be used. The ammonium salts of organic acids can be used; for example, ammonium oxalate, ammonium acetate, ammonium citrate, ammonium tartrate. It has also been found that metaphosphoric acid and sodium metaphosphate can be used.

I have also found that ammonium chloride can be used, but evolves too much odor, for use in hair waving. It is, however, usable under conditions where odor is not objectionable. Ammonium sulphate gives a slow heat over a relatively long period of time.

Potassium alum, sodium alum and ammonium alum give heat slowly over a short period.

Zinc chloride is rapidly acting and gives good heat, but for some uses is objectionable because of its hygroscopic nature. Aluminum chloride is rapidly acting, gives a fair amount of heat, but is also hygroscopic. Magnesium chloride gives a substantial amount of heat. The amount of heats given by sodium sulphate, zinc carbonate, and sodium metaphosphate are given hereafter.

A particularly valuable substance is zinc ammonium chloride, a complex ammonium salt. Zinc ammonium chloride and zinc ammonium sulphate are among the best substances to use in my combination. They are not deliquescent, they are cheap, their action is more vigorous and even, and there is a minimum of odor of reaction. Zinc ammonium chloride is preferred, particularly for use in hair waving. This substance gives a regulated flow and forms a zinc couple.

A valuable addition to my mixture is a substance furnishing calcium ions, for example calcium hydroxide. Other calcium salts are usable, whether soluble or insoluble. Calcium hydroxide is preferred for use in pads for hair waving. It accelerates heat production, with a minimum of moisture, but an excess of moisture will not interfere with the reaction. It increases the amount of heat produced from 118° C. to 120°. There is less residue after reaction.

The following are given as examples of mixtures and although each is specifically claimed, there is no intention to entirely limit the invention thereto because the invention is broadly based on my discovery of the heat evolving action, for the purpose herein, of a mixture of hydrolyzable substance giving an acidic reaction or of an organic acid, powdered magnesium, and an inert diluent, in the presence of water:

Example I 1 gram magnesium powder of a fineness of from approximately 40 to 80 mesh; 3 grams of powdered zinc ammonium chloride; 1.5 grams of infusorial earth; 0.5 grams of calcium hydroxide. It is believed that the calcium ion promotes the reaction and prolongs the initial rate of reaction, thus prolonging the heating period, as a whole. A high peak heat of 120 to 122° C. is obtained, which represents a substantial increase of temperature over a mixture which does not contain the ca. ion.

Example II 1 gram of magnesium powder; 3 grams of powdered zinc ammonium chloride; 1.5 grams of infusorial earth; addition of water gives a peak heat of 115° C. In this formula some residue is left owing to slightly incomplete reaction and it is also found desirable, for some uses, to retard the speed of reaction at the outset, so that when the composition is used in pads for hair waving the operator has some time in which to apply the sachets before reaction has progressed materially (see Example I).

Example III 1 gram of magnesium powder of approximately 40 to 80 mesh; 2 grams of ammonium chloride; 1 gram of zinc dust; 2 grams of infusorial earth. When approximately 3 cc of water are added to this mixture, a peak temperature of 112° C. is obtained.

For the purpose of making hair waving pads, one of my best combinations is that of Example I having magnesium powder, zinc ammonium chloride powder, and an inert diluent such as infusorial earth, bentonite clay, fuller's earth, wood flour, kaolin, activated carbon, etc., and a substance providing ionic calcium. Other dilutents may be used in combination with other hydrolyzable salts, or organic acid salts, or organic acids, or with alums, or with metaphosphates or metaphosphoric acid.

An example of the heat producing characteristics of one of my best mixtures for hair waving use is the following: About 6 grams of the mixture evolves at the end of about a minute a temperature of 97° centigrade; two minutes later a temperature of 116°, one minute later, a temperature of 120°, which is the peak temperature; and five minutes later, a temperature of 100°; one minute later, a temperature of 93°; and one minute later, a temperature of about 90°. For a sodium sulphate mixture, a temperature of 90° is reached in about a minute; four minutes later the peak temperature of 110° is reached; four minutes later, 105°; one minute later 100°; three minutes later 90°.

When using zinc carbonate, a temperature of 95° C. is reached about a minute after application of the water; three minutes later, a temperature of 105°; one minute later 110°, which is the peak; five minutes later, 95°. Using sodium metaphosphate, a temperature of 85° is reached in about a minute; four minutes later peak temperature of 110° is reached; six minutes later, 90°.

I am aware that various mixtures for my general purpose have been made, but in all with which I am acquainted, there are one or more objections. For example, the products of reaction or the original substances before reaction are either corrosive, or the mixture is liable to decomposition or is explosive, or deteriorates on exposure to air.

In some of the prior mixtures in which ammonium chloride is used, there is on reaction, an odor of ammonia which is objectionable to many persons, particularly in the hair waving industry. This condition seems to be partly due to the fact that complete reaction has not taken place, and partly due to the use of certain metals, other than magnesium. I have found that when a complex salt, such as zinc ammonium chloride, is used, a better result is obtained. No noticeable odors are evolved in the reaction and the reaction is smoother or more even, and is more prolonged. Using zinc ammonium chloride, heat as high as 115° C. may be obtained. However, as before stated, it is found desirable for some purposes to lessen the speed of reaction at the beginning to give the user (in case the material is used in sachets employed in hair waving) plenty of time to apply the sachets, before high heat is developed. In other words, it is desirable to have a slowly starting reaction which is accelerated at the end of a certain time to thereafter more rapidly reach the peak temperature. I found that the calcium ion regulates the reaction so that the initial rate of reaction is prolonged. Moreover, higher heats, of 120 to 122° C. are obtained.

I claim various combinations of all of the substances disclosed herein, both broadly and specifically, and also broadly claim the use of magnesium, with acidic materials, and an inert dilutent, for the purposes herein.

For use for sachets or pads for hair waving, the following substances are believed to be the best, in combination with magnesium and variable quantities of inert diluent: zinc ammonium chloride; aluminum chloride and zinc dust; ammonium chloride and zinc carbonate; calcium chloride; zinc chloride; zinc ammonium sulphate; ammonium sulphate and zinc dust; and ammonium sulphate and zinc carbonate.

It will, of course, be understood that the rate or speed of reaction can be varied by varying the amount of diluent, the diluent acting to blanket the reaction in varying degrees.

Although I contemplate using the materials herein in various ways, my main object is to produce material particularly adapted for use in the hair waving industry.

I claim as my invention:

1. A composition which is adapted for use in the waving of hair, and which aids in the curl fixation by simultaneously heating the curl, with heat evolved by the composition and by permeating the curl with one or more substances of the composition, which comprises, magnesium and a complex salt capable of reacting therewith to evolve heat said substance having more than one positive radical, at least one of which is alkaline upon ionization.

2. A complex according to claim 1 wherein the alkaline radical is ammonium.

3. A composition according to claim 1 wherein the complex salt is an alum.

4. A composition according to claim 1 in which the complex is an ammonium alum.

5. A composition adapted to be used in the waving of hair which is capable of simultaneously producing heat and evolving ammonia consisting of metallic magnesium and an ammonium salt capable of decomposing and evolving ammonia in reacting with the magnesium, and substance inert to the reaction.

6. A composition adapted to evolve heat when treated with water comprising, a mixture of magnesium, zinc ammonium chloride, and an inert diluent.

7. A composition adapted to evolve heat when treated with water comprising, magnesium, zinc ammonium chloride, an inert diluent, and a substance furnishing calcium ions.

8. A composition adapted to evolve heat when treated with water comprising, 1 part of magnesium, 3 parts of zinc ammonium chloride and 1.5 parts of an inert diluent.

9. A composition adapted to evolve heat when treated with water comprising, magnesium, ammonium chloride, powdered zinc and an inert diluent.

10. A composition adapted to evolve heat when treated with water comprising a reactive metal which is above iron and below the alkali and alkaline earth metals in the electromotive series of metals, zinc ammonium chloride, and an inert diluent.

11. A composition adapted to evolve heat when treated with water comprising an uncombined metal in reactive state which metal is above iron and below the alkali and alkaline earth metals in the electromotive series of metals, zinc ammonium chloride, zinc metal in reactive state, and a substance capable of producing calcium ions.

12. A composition adapted to evolve heat when treated with water comprising, magnesium in reactive state, zinc ammonium chloride, and zinc metal in reactive state.

13. A composition adapted to evolve heat when treated with water comprising, magnesium, and a complex metallic ammonium chloride.

MAURICE L. SPIEGEL.